(12) United States Patent  (10) Patent No.: US 8,040,369 B1
Gargan et al.  (45) Date of Patent: Oct. 18, 2011

(54) SYSTEM AND METHOD FOR TRANSFERRING OBJECTS IN A VIDEO CONFERENCING SESSION

(75) Inventors: Garrett Daniel Gargan, Corvallis, OR (US); Juan Alemany, Albany, OR (US); Michael D. Derocher, Corvallis, OR (US); Mark C. Solomon, San Jose, CA (US); Robert Cantrell, Alexandria, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1223 days.

(21) Appl. No.: 11/701,589

(22) Filed: Feb. 2, 2007

(51) Int. Cl.
*H04N 7/14* (2006.01)

(52) U.S. Cl. .................... 348/14.01; 709/204

(58) Field of Classification Search ..... 348/14.01–14.16
See application file for complete search history.

(56) References Cited

U.S. PATENT DOCUMENTS

| | | | | |
|---|---|---|---|---|
| 4,748,618 A * | 5/1988 | Brown et al. | ............... | 348/14.12 |
| 4,953,159 A * | 8/1990 | Hayden et al. | ............ | 348/14.08 |
| 5,012,509 A * | 4/1991 | Nakamura et al. | ......... | 348/14.08 |
| 5,565,911 A * | 10/1996 | Ishikawa et al. | ............ | 348/14.08 |
| 5,689,641 A * | 11/1997 | Ludwig et al. | ............. | 348/14.08 |
| 6,124,880 A * | 9/2000 | Shafiee | ....................... | 348/14.08 |
| 6,330,022 B1 * | 12/2001 | Seligmann | ................. | 348/14.08 |
| 6,678,698 B2 * | 1/2004 | Fredell et al. | ............ | 707/999.01 |
| 6,959,322 B2 | 10/2005 | Ludwig et al. | | |
| 7,032,030 B1 | 4/2006 | Codignotto | | |
| 7,069,234 B1 | 6/2006 | Cornelius et al. | | |
| 7,885,330 B2 * | 2/2011 | Golas et al. | .................. | 348/14.1 |
| 2004/0169722 A1 * | 9/2004 | Pena | .......................... | 348/14.01 |
| 2005/0097608 A1 * | 5/2005 | Penke et al. | ............... | 348/14.01 |
| 2007/0143402 A1 * | 6/2007 | Kumagai | .................. | 348/14.08 |
| 2007/0285504 A1 * | 12/2007 | Hesse | ........................ | 348/14.08 |

* cited by examiner

*Primary Examiner* — Curtis Kuntz
*Assistant Examiner* — Maria El-Zoobi

(57) ABSTRACT

A system and method of virtually passing an object in near real time between separated participants in a remote conference session is disclosed. The method includes providing a video screen at first and second locations. An object can be inserted into a scanning device coupled to a scanner opening located proximate to the video conference screen in the first location to form a scanned object file. Video imaging of the insertion of the object can be transmitted and displayed at the second location. The scanned object file can be received and printed at the second location in near real time and output through a printer opening positioned proximate the video screen at the second location to create an illusion of virtually passing the object between locations.

23 Claims, 4 Drawing Sheets

SYSTEM AND METHOD FOR TRANSFERRING OBJECTS IN A VIDEO CONFERENCING SESSION

BACKGROUND

Since the invention of the telephone people have sought to supplement face to face meetings with conferencing via remote locations. With the advent of the internet and the greater availability of broadband communications, it was often assumed that remote conferencing would be the wave of the future. For example, businesses, groups, families, and friends could communicate with each other as if they were in the same room. Ideas and visions could be shared without the need for cross-continent trips by business people or other types of groups.

The realization of this dream, however, has never fully come to fruition. Important business is often still done face to face with decisions made only after personal communication. Similarly, board meetings continue to be physically held around a conference table rather than a group of video or audio conference rooms.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
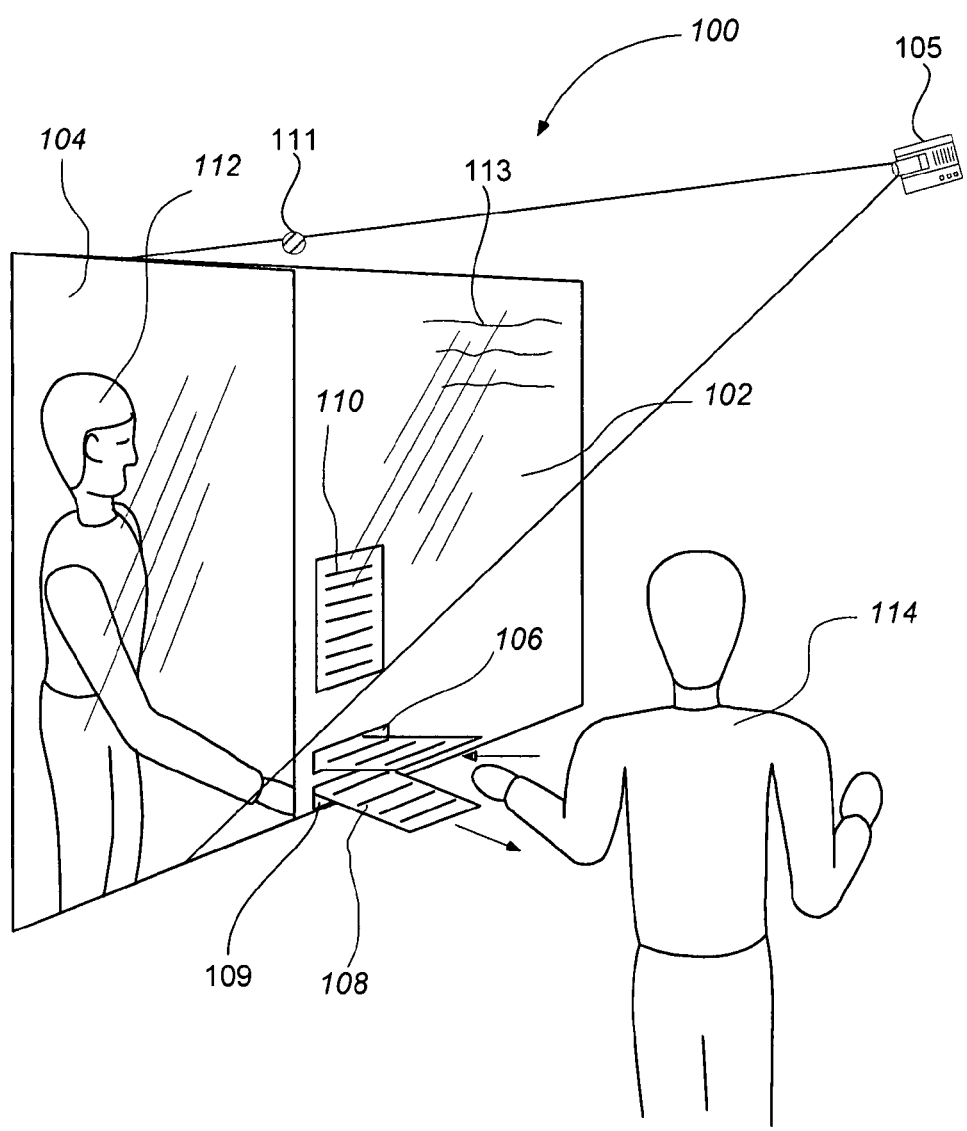
FIG. 1 is an illustration of a system for virtually transferring an object in near real time between separated participants in a remote conferencing session in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Many reasons exist for the unfulfilled realization of remote conferencing. Even with the advancement of broadband data connections and audiovisual presentation equipment, subtle (and not so subtle) differences make people sufficiently uncomfortable that they are often unwilling to make important decisions via remote conferencing. Clearly there is tangible value in the intimacy that arises when people feel each other's physical presence.

For example, in many meetings communication is made between attendees using visual as well as oral and written means. An attendee may wish to communicate a message or share an insight by drawing a picture or a graph. Important documents or other types of written material or objects may need to be shared between the attendees. Indeed, even the physical act of transferring the written material between the attendees can portend an important psychological connection between the participants present at the meeting.

Although the electronic transfer of documents has been possible for some time, the subtle differences between physically passing the documents and electronically transmitting documents to remote locations can reduce synergy at meetings, limit the sharing of concepts and ideas, and disrupt the ambiance that people are accustomed to when meeting face to face. Thus, despite the convenience of remote conferencing, the potentially unnatural communication between the remote locations tends to reduce the use of remote conferencing. This is evidenced by the large percentage of people that still spend valuable time and money traveling to meet and communicate personally.

In accordance with one aspect of the invention, it has been recognized that a system and methods for transferring objects in near real time between separated participants in a video conferencing session can provide the illusion of virtually passing objects between the separated participants. The system and methods can reduce the subtle differences that occur when documents, printed material, sketches, and other types of objects are shared between remote locations rather than in personal meetings, thus providing a more natural, intimate communication between the separated participants which enables an increase in synergy and encourages the sharing of concepts and ideas. The system and methods can provide a more realistic meeting experience to the separated participants which can encourage an increased use of remote conferencing, thereby decreasing unnecessary expenditures of time and money spent traveling to meet in person.

When people meet in person, they are typically able to easily share ideas, documents, business cards, drawings, objects, and other types of information. The information can be passed from one meeting participant to another with little effort. This activity reinforces a sense of confidence and trust between participants. In remote conferencing, however, it can be more laborious for meeting participants at separate locations to share written ideas or other objects disrupting the momentum of group actions. While it has been possible for some time to digitally record and transmit documents between separate locations, the amount of time and effort it takes for a meeting participant at a first location to scan, save, and transmit a document; and a remote participant at a second location to receive and print the document, can discourage the sharing of all but the most important ideas. Thus, remote meetings often lack the synergy of face to face meetings and reduce the level of sharing between meeting participants.

To overcome these limitations, a system 100 for virtually transferring an object in near real time between separated participants in a remote conferencing session is illustrated in one embodiment in FIG. 1. The system enables a participant 114 in a remote conferencing session at a first location to quickly and easily send an object, such as a written document, scribbled notes, a drawing, a business card, and the like to a receiving participant 112 located at a separate location.

The system 100 includes a video conference screen 104 located in a first location. An audiovisual monitoring system 105 can be used to project a video image and audio from a separate location onto the video conference screen. Similarly, meeting participants at the separate location can receive audiovisual information from one or more cameras 111 set up to record information at the first location. A separate location, as used in this disclosure, can be anywhere separate from the first room in which the video conference screen is located. For example, the separate location may be another room or office just down the hall in the same building or an adjacent building. Alternatively, the separate location may be on a different continent.

In one embodiment of the present invention, a meeting participant 114 at the first location can share a hand written drawing with remote participants at one or more separate locations. The meeting participant can simply approach the video conference screen 104 and place the drawing into a scanner input opening 106. An image of the meeting participant approaching the screen can be seen at the separate location(s). The drawing can be scanned, converted to a digital data file, and transmitted to the separate location(s). In near real time, the drawing can be printed at the separate location(s). One or more receiving participants 112 can immediately retrieve the drawing from a printer opening 109.

The system 100 can provide the illusion of virtually passing the object from the first location to the separate locations by providing a near-real-time image at the separate locations of a meeting participant placing the object in the scanner opening 106. The meeting participant can then view the receiving participant(s) retrieving the object at the separate locations at the printer opening 109. The position of the scanner opening at the first location can correspond closely with the position of the printer opening at the separate location(s). This can enhance the illusion of virtually passing the object, as it will appear to meeting participants at all locations that a document is put into a scanner opening at one location and nearly immediately being printed at the respective separate locations.

The illusion of virtually passing the object can be further enhanced by minimizing latency between locations. This can be accomplished by connecting each location involved in a video conference with a dedicated high speed digital connection. For example, a DS3 or T3 connection having a throughput of 45 megabits per second can be used. The speed of the connection can be based on the needs of the video conference users. A user that wants to transmit high definition video and complex documents may require substantially more bandwidth than a user that is satisfied with a regular definition video connection between sites. The latter may be able to transmit audiovisual images and object data files in near real time with a lower bandwidth, such as 10 megabits per second. A data connection between each location can be used that has a sufficient bandwidth that audiovisual information and object data files can be transmitted in near real time.

It is also possible that a shared high speed digital connection can be used to transmit the audiovisual information and object data files in near real time. One way of ensuring that the audiovisual information and object data files are transmitted between locations in near real time is to use packetized data with prioritized packets, as can be appreciated. The use of prioritized packets allows data to be sent with a reasonable assurance that it will arrive at its destination in the required time. Additional data can be sent across the digital connection with a lower priority, allowing the audiovisual information and object data files to be transmitted in near real time while also using the connection to send data that is not as time critical.

Objects or documents transmitted between locations can be transmitted with sufficient speed that any latency between scanning at a first location and printing at separate location(s) is minimally noticed by participants at separate locations. For example, the time between an object being scanned and transmitted from a first location to starting to print at the separate locations can be less than 5 seconds. In another embodiment, the time can be less than half a second, which would be minimally noticed by the meeting participants.

When transmitting video, documents, and objects, it is not necessary to transmit entire files. Rather than waiting for an object or document to be scanned and saved prior to transmission, it is possible that a scanning file can be streamed to the separate location(s) to enable the printing process to begin before the scanning has been completed. Similarly, audiovisual information can be streamed between separate locations, as can be appreciated.

The ability to virtually transfer objects or documents between separate locations opens up entirely new possibilities to enhance the effectiveness of remote conferencing. For example, when business people meet it is customary to exchange business cards. The system 100 enables participants in a remote conference to exchange business cards in much the same manner as they would in a face to face meeting. A first participant 114 at a first location can view a remote participant 112 placing his or her business card into the scanner input opening at the remote location. The participant at the first location can then receive the business card in near real time from the printer opening 109, creating the illusion that the business card was passed between the participants.

The process of exchanging business cards in certain cultures can be more complex. For example, in some Asian countries, the method of passing and receiving a business card shows a level of respect between the participants. In one method, a business person presents his or her business card to an associate by holding it lengthwise with two hands, bowing towards the associate, and presenting the card. The associate typically bows and receives the lengthwise card with two hands, making sure to read the information contained on the card as a matter of respect. The respect shown between the associates can be critical in making important business decisions. Even though it is possible to scan and email information such as business cards, the synergy created by the business associates trading business cards in a culturally appropriate manner is typically lost when meeting though remote conferencing.

However, using the system 100, a first participant 114 at a first location can view a remote participant 112 bowing and placing his or her business card into the scanner input opening at the remote location. The scanner coupled to the scanner input opening can be configured to receive business cards in either the width or length dimensions, allowing the business card to be placed lengthwise into the scanner. The remote participant can then bow and receive the business card from the printer opening 109. The printer can be configured to print the business card widthwise or lengthwise to enable the remote participant to be imaged as he or she bows and receives the business card lengthwise, using two hands to grasp the card and read the information contained thereon. Thus, the system 100 enables the sharing of documents, business cards, drawings, notes, and other types of written objects to be shared with the same synergy that is available in face to face meetings.

The video conference screen 104 can include an interactive whiteboard 102 which can be used by the separated participants to share thoughts or ideas. For example, a meeting participant 114 at the first location can form text or drawings 113 on the whiteboard. The text or drawings can be digitally recorded and sent to the separate location to be viewed by a receiving participant 112. Alternatively, the contents of the whiteboard can be printed to form a printed document 108 at the first location and output through the printer opening 109. The printed document can then be placed in the scanner opening 106 to be scanned and virtually sent to the separate location(s). The scanned document can be received in near real time at the separate locations and output from the printer opening 109. The scanned document can also be displayed 110 on the whiteboard at the separate location(s).

Figure 2:
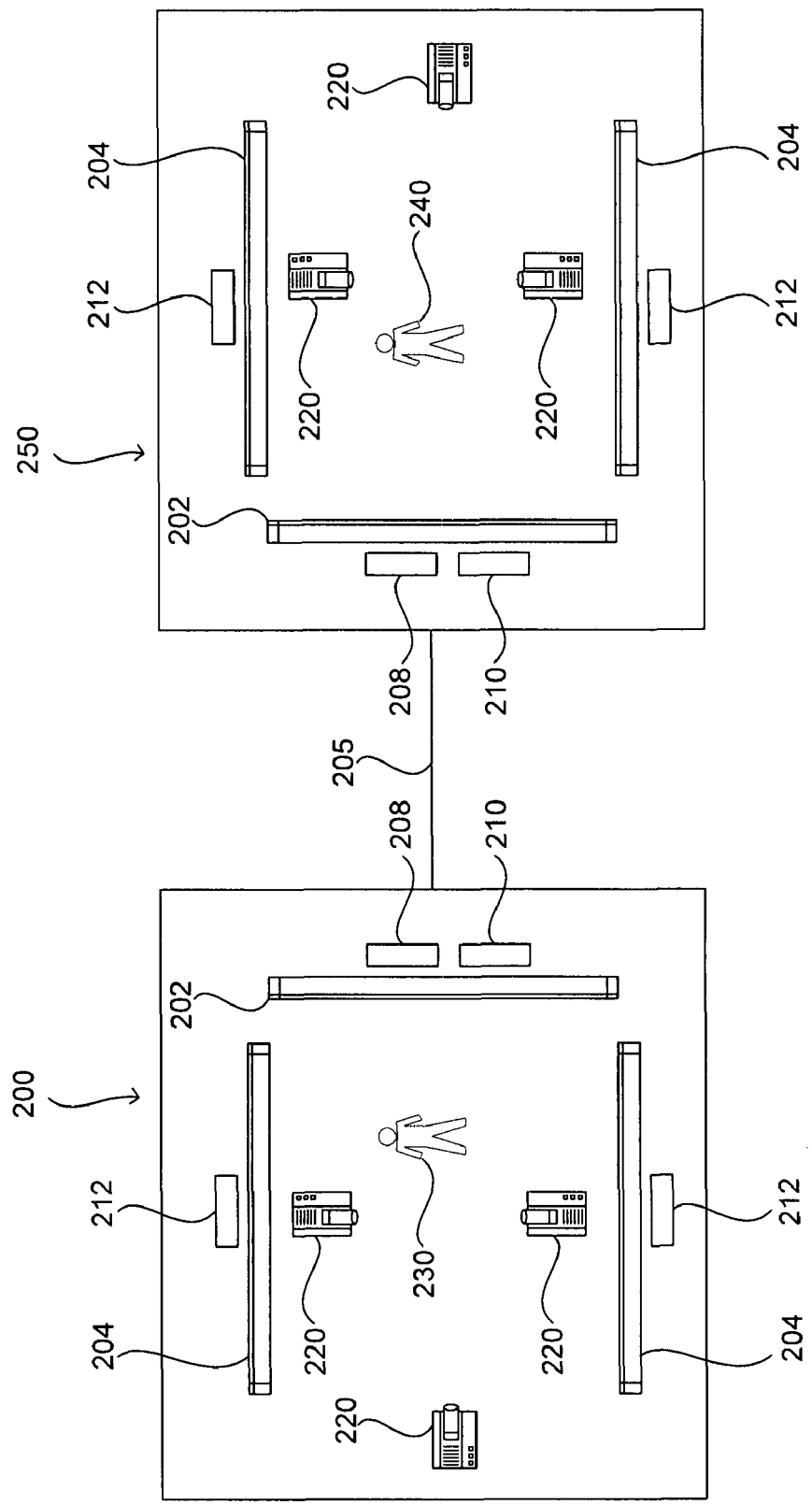
FIG. 2 is a block diagram of a system for virtually transferring an object in near real time between separated participants in a remote conferencing session in accordance with an embodiment of the present invention.

FIG. 2 shows a block diagram of another embodiment of a system for virtually transferring an object in near real time between separated participants in a remote conferencing session. The system includes a first location 200 in communication with a separate location 250 through a high speed data connection 205. Each location can include a front video screen 202 and one or more additional video screens 204 located in other parts of the video conference room. Each video screen can be associated with a printer 208, and a scanner 210. The printer and scanner can be in communication with the high speed data connection 205. Alternatively, a combination printer/scanner 212 can be associated with the video screens.

The printer and scanner, or combination, are coupled to a printer opening 109 and scanner opening 106, as shown in FIG. 1. The openings are proximate to the video screens 202, 204. The openings may be positioned to the side of the screens, directly below the screens, above the screens, or located somewhere within the screens. As previously stated, placing the openings in relatively corresponding locations in each room enhances the illusion that the object is being virtually passed between the separate locations, as seen on the video screens.

Each video screen 202, 204 can be associated with a video projector 220 and one or more cameras 111 (FIG. 1) to enable the participants to be viewed by the participants at the separate locations. When more than one video screen is located in a room, it can enable a meeting participant to pass virtual objects more easily. For example, rather than having to walk to the front of the room, a sending participant 230 may pass a business card or some other object by turning to a side of the room and inserting the business card into the scanner opening. A receiving participant 240 can view the sending participant inserting the card into the scanner opening at the first location 200. The card can then be printed in at least one separate location 250 in near real time, creating the illusion that the card was virtually passed from the sending participant to the receiving participant(s) at the separate location(s).

Use of multiple screens and printer/scanners allows information to be shared between meeting participants without the disruption of standing up and walking to the front of the room. Instead, a participant can merely reach to the right or left of where he is sitting, as he would do in a face to face meeting, and place the object, such as the business card or drawing, in the scanner opening to virtually send the object to other participants at separate locations. The receiving participant can reach to the nearest printer opening and retrieve the object, thus enhancing the illusion that the participants are all in the same room where they are capable of easily sharing written information and other types of objects.

In another embodiment, a scanner 210 can be used that is capable of scanning three dimensional objects and recording the information in a three dimensional digital data file. Similarly to the previous embodiment, a sending participant 230 can place a three dimensional object in the three dimensional scanner to be scanned. Receiving participant(s) 240 can view the object as it is placed into the scanner. The 3d digital data file can then be sent to one or more separate locations 250 in near real time. The printing device 208 can be a rapid prototyping device or other type of object replication device that is able to quickly reconstruct the three dimensional object that was scanned. The receiving participants can then retrieve the object from the printer opening, just as if it was passed in a face to face meeting. Thus, the present system is not merely limited to virtually transferring two dimensional printed material, but can be used to virtually transfer three dimensional objects as well.

As rapid prototyping devices improve, the size and types of objects that can be virtually transferred between separate locations will increase and the cost of doing so will decrease, allowing more remote conferencing to be used, even in situations where it is necessary to share three dimensional objects. For example, an engineering group that wants to brain storm on different types of designs for a new product may be able to meet with their associates on another continent and propose several different shaped objects which may be used. Rather than merely describing the objects, they can be shared in near real time, just as if the associates were in the same meeting. The use of the interactive video screens enhance the illusion that the three dimensional image is being passed from one participant to another, creating the same inter-personal feelings that are present when sharing documents and objects in a face to face meeting.

Figure 3:
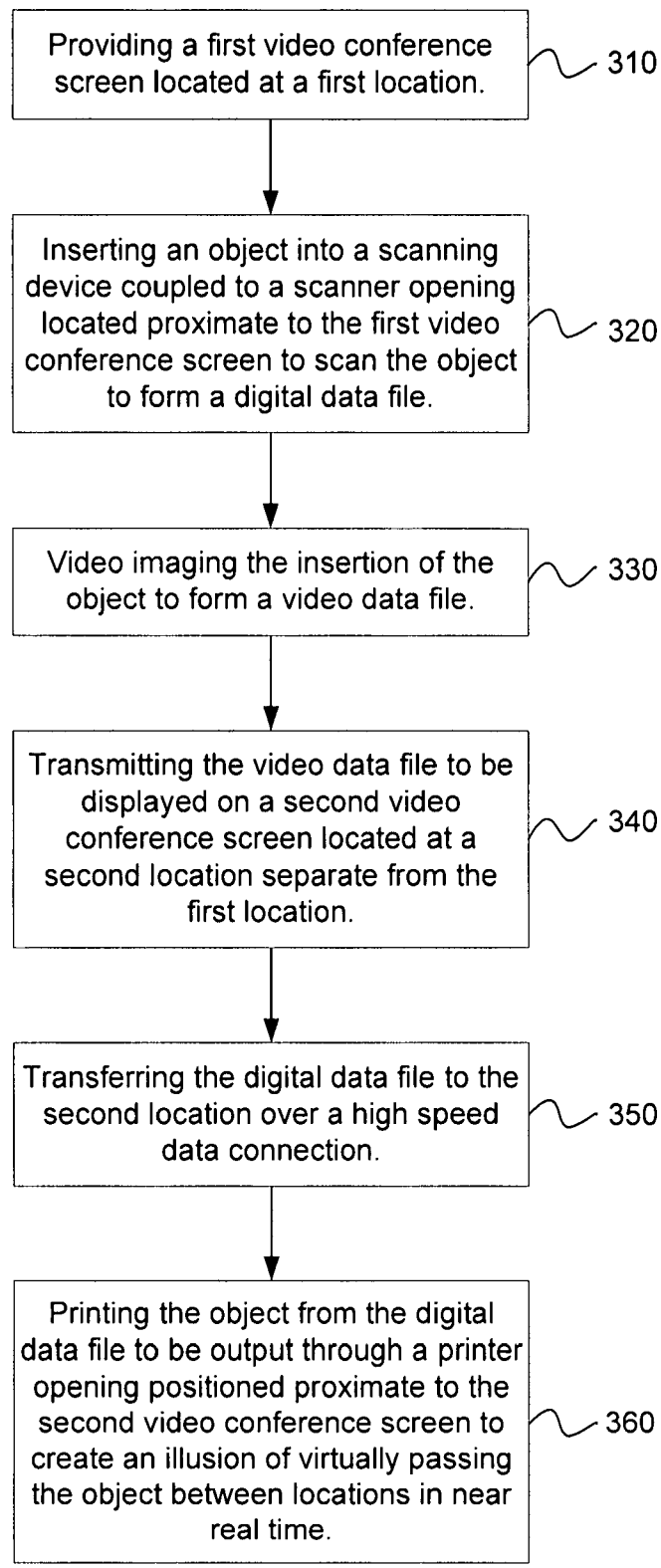
FIG. 3 is a flow chart depicting a method of virtually passing an object in near real time between separated participants in a video conferencing session in accordance with an embodiment of the present invention.

In another embodiment, a method 300 of virtually passing an object in near real time between separated participants in a video conferencing session is disclosed, as shown in the flow chart in FIG. 3. The method can include the operation of providing 310 a first video conference screen located at a first location. An object can be inserted 320 into a scanning device coupled to a scanner opening located proximate to the first video conference screen to scan the object to form a digital data file. The insertion 330 of the object can be imaged using, for example, a video recording device, to form a video data file. The video data file can be transmitted 340 to be displayed on a second video conference screen located at a second location separate from the first location. The digital data file can be transferred 350 to the second location over a high speed data connection. And finally, the object from the digital data file can be printed 360 to be output through a printer opening positioned proximate to the second video conference screen to create an illusion of virtually passing the object between locations in near real time.

Figure 4:
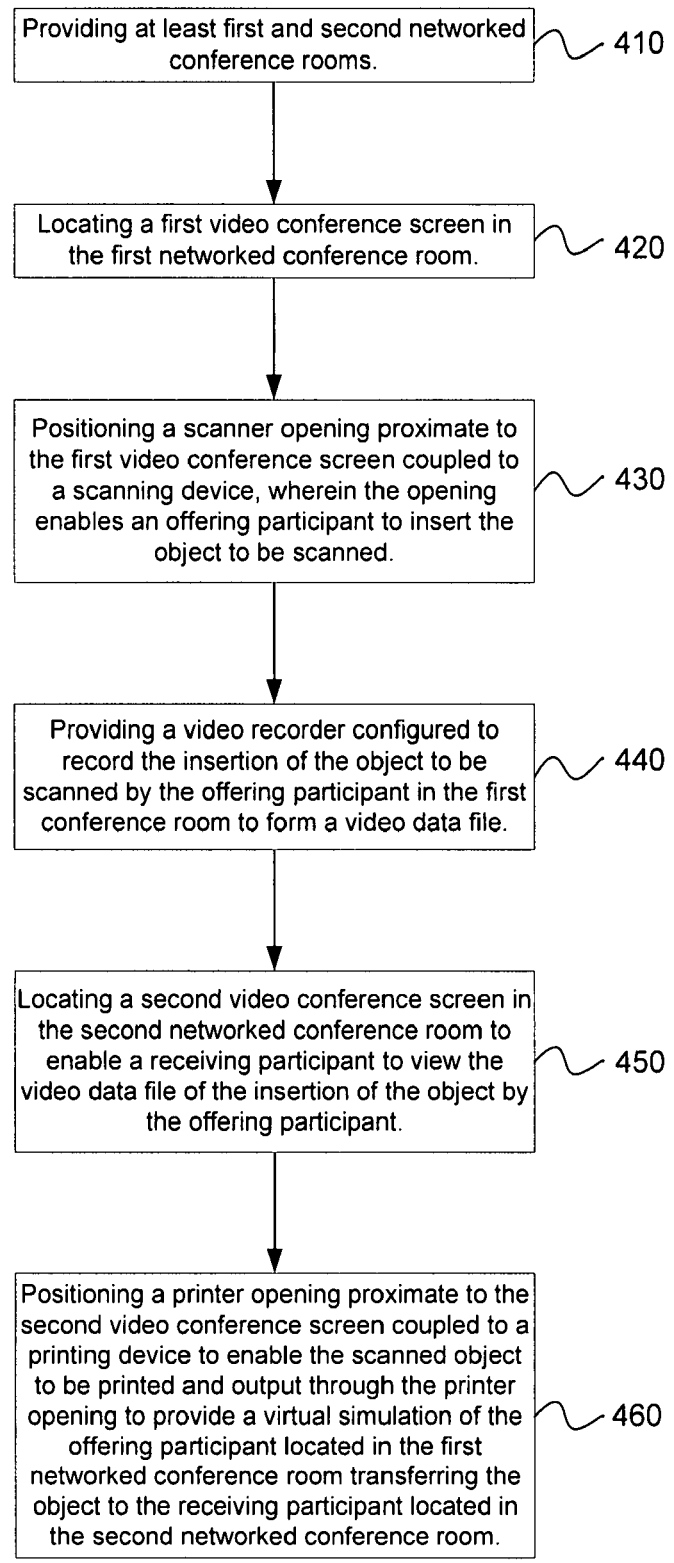
FIG. 4 is a flow chart depicting a method of making a system for transferring an object in near real time between separated participants in a video conferencing session.

In an additional embodiment, a method 400 of making a system for transferring an object in near real time between separated participants in a video conferencing session is disclosed, as shown in the flow chart of FIG. 4. The method can include the operation of providing 410 at least first and second networked conference rooms. A first video conference screen can be located 420 in the first networked conference room. A scanner opening can be positioned 430 proximate to the first video conference screen coupled to a scanning device. As previously discussed, the scanner opening enables an offering participant to insert the object to be scanned. The location of the scanner opening affects the illusion that the object is being virtually passed.

An additional operation of the method 400 can include providing 440 a video recorder configured to record the insertion of the object to be scanned by the offering participant in the first conference room. The recording can be saved as a video data file. A second video conference screen can be located 450 in the second networked conference room to enable a receiving participant to view the video data file of the insertion of the object by the offering participant. Finally, a printer opening can be positioned 460 proximate to the second video conference screen coupled to a printing device to enable the scanned object to be printed and output through the printer opening to provide a virtual simulation of the offering participant located in the first networked conference room transferring the object to the receiving participant located in the second networked conference room.

In general, embodiments of the present invention can enable participants in remote conference sessions to send and receive written material and three dimensional objects as if they were being passed between participants in the same room. The placement of the scanner and printer openings in conjunction with the display of audiovisual information provides the illusion that the objects are placed in an opening in a first location and are nearly immediately received at an opening in a separate location, as if there were a slot between the locations. This illusion provides a natural way for people to share objects such as written material or three dimensional items in a very similar manner as would occur in a face to face meeting. Thus, the synergy and ambiance that occurs in a personal meeting can now be achieved using remote conferencing, allowing more meetings to occur between disparate locations and reducing the time and expense previously required in traveling between these locations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of virtually passing an object in near real time between separated participants in a video conferencing session, comprising:
   a. providing a first video conference screen located at a first location;
   b. inserting an object into a scanning device coupled to a scanner opening located proximate to the first video conference screen to scan the object to form a digital data file;
   c. video imaging the insertion of the object to form a video data file;
   d. transmitting the video data file to be displayed on a second video conference screen located at a second location separate from the first location;
   e. transferring the digital data file to the second location over a high speed data connection;
   f. printing the object from the digital data file to be output through a printer opening positioned proximate to the second video conference screen to create an illusion of virtually passing the object between locations in near real time.

2. A method as defined in claim 1, further comprising scanning the object at the second location by inserting the object into a scanning device coupled to a scanner opening located proximate to the second video conference screen.

3. A method as defined in claim 2, further comprising printing the object to be output through the printer opening positioned proximate to the first video conference screen to create the illusion of virtually passing the object from the second location to the first location.

4. A method as defined in claim 3, further comprising printing the object from the digital data file, wherein the object is a business card and the business card can be printed in one of widthwise and lengthwise directions.

5. A method as defined in claim 1, further comprising transmitting the video data file and transferring the digital data file over a dedicated high speed digital connection between the first and second locations.

6. A method as defined in claim 5, further comprising transmitting the video data file and transferring the digital data file over a dedicated high speed digital connection between the first and second locations, wherein the high speed digital connection can transmit greater than 30 megabits per second.

7. A method as defined in claim 1, further comprising transmitting the video data file and transferring the digital data file over a high speed digital connection configured to send the video data file and the digital data file using packetized data with prioritized packets to enable the video data file and the digital data file to be sent between locations such that latency between the locations is not noticeably perceived by the separated participants.

8. A method as defined in claim 1, further comprising the step of positioning the scanner opening for insertion of the object at a corresponding position at the first video conference screen with the printer opening for delivering the object at the second video conference screen, thereby enhancing the illusion of virtually passing the object from the first location to the second location in near real time.

9. A system for virtually transferring an object in near real time between separated participants in a remote conferencing session, comprising:
   a. A plurality of video conference settings, each setting including a display screen and audiovisual monitoring system for capturing audiovisual information of each participant;
   b. a scanning device positioned proximate to a first display screen in a first video conference setting and configured to receive the object through a scanning input opening proximate to the display screen and create a digital data file of the object to be transferred between separated participants;
   c. a high speed data connection configured to transmit the audiovisual information to enable the separated participants to view the object being placed in the scanning input in at least one separate video conference setting; and
   d. a printing device positioned proximate to a second display screen at the at least one separate conference setting and configured to receive and print the digital data file and output the object through a printer output opening positioned proximate to the second display screen in near real time to create an illusion of passing the object between locations.

10. A system as defined in claim 9, wherein the object is selected from at least one of the group consisting of a printed item and a three dimensional item capable of being scanned.

11. A system as defined in claim 9, wherein the scanning device is configured to scan a three dimensional object to form a three dimensional digital data file.

12. A system as defined in claim 11, wherein the printing device is a rapid prototyping device configured to construct the three dimensional object from the three dimensional digital data file.

13. A system as defined in claim 9, wherein the scanning input opening and the printer output opening are positioned within the display screen.

14. A system as defined in claim 9, wherein the scanning input opening and the printer output opening are positioned adjacent the display screen.

15. A system as defined in claim 9, wherein each display screen in each of the plurality of video conference settings is coupled to a printing device and a scanning device to enable each video conference setting to send and receive the object.

16. A system as defined in claim 9, wherein the scanning input opening and the printer output opening are positioned in substantially similar locations in each display screen at each of the video conference settings to enhance the illusion of virtually passing the object between conference settings in near real time.

17. A system as defined in claim 9, further comprising placing a plurality of display screens in each video conference setting, wherein each display screen is associated with a scanner, a printer, and an audiovisual monitoring system for capturing audiovisual information of participants in the video conference setting, the plurality of display screens enabling a participant to more easily virtually pass the object between conference settings in near real time.

18. A method of making a system for transferring an object in near real time between separated participants in a video conferencing session, comprising:
   a. providing at least first and second networked conference rooms;
   b. locating a first video conference screen in the first networked conference room;
   c. positioning a scanner opening proximate to the first video conference screen coupled to a scanning device, wherein the opening enables an offering participant to insert the object to be scanned;
   d. providing a video recorder configured to record the insertion of the object to be scanned by the offering participant in the first conference room to form a video data file;
   e. locating a second video conference screen in the second networked conference room to enable a receiving participant to view the video data file of the insertion of the object by the offering participant; and
   f. positioning a printer opening proximate to the second video conference screen coupled to a printing device to enable the scanned object to be printed and output through the printer opening to provide a virtual simulation of the offering participant located in the first networked conference room transferring the object to the receiving participant located in the second networked conference room.

19. A method of making as defined in claim 18, wherein positioning the scanner further comprises positioning the scanner capable of scanning an object selected from the group consisting of hand written items, printed items, and three dimensional items.

20. A method of making as defined in claim 19, wherein positioning the printer further comprises positioning a rapid prototyping printer that is a rapid prototyping device capable of constructing the three dimensional items.

21. A method of making as defined in claim 18, wherein positioning the printer further comprises positioning a document printer that is capable of printing different sized documents with the document printed in one of widthwise and lengthwise positions.

22. A method of virtually transferring an object at a first location in near real time to a separated participant at a second location in a video conferencing session, comprising:
   a. creating a digital data stream from the scanning of an object inserted into a scanning device coupled to a scanner opening located proximate to a first video conference screen;
   b. communicating the digital data stream to an object replication device at the second location over a high speed data connection;
   c. creating a first video data stream of the object being inserted into the scanning device;
   d. transmitting the first video data stream to a second video conference screen to a second location; and
   e. receiving a second video data stream on the first video conference screen of the creation of a replica of the object, the creation occurring proximate to the second video conference screen at the second location thereby creating an illusion of virtually transferring the object in near real time.

23. A method of virtually receiving a replicated object a first location from a separated participant at a second location in a video conferencing session in near real time, comprising:
   a. receiving a first video data stream of the separated participant inserting an object into a scanning device coupled to a scanner opening located proximate to a first video conference screen;
   b. receiving a digital data stream representing a scanned copy of the object;
   c. replicating the object from the digital data stream on an object replication device located proximate to a second video conference screen thereby creating an illusion of receiving the replicated object from the second location in near real time;
   d. creating a second video data stream of the object being replicated; and
   e. communicating the second video data stream over a high speed data connection to the first video conference screen to enable a meeting participant at the second location to view the object being created.

* * * * *